Patented Nov. 15, 1938

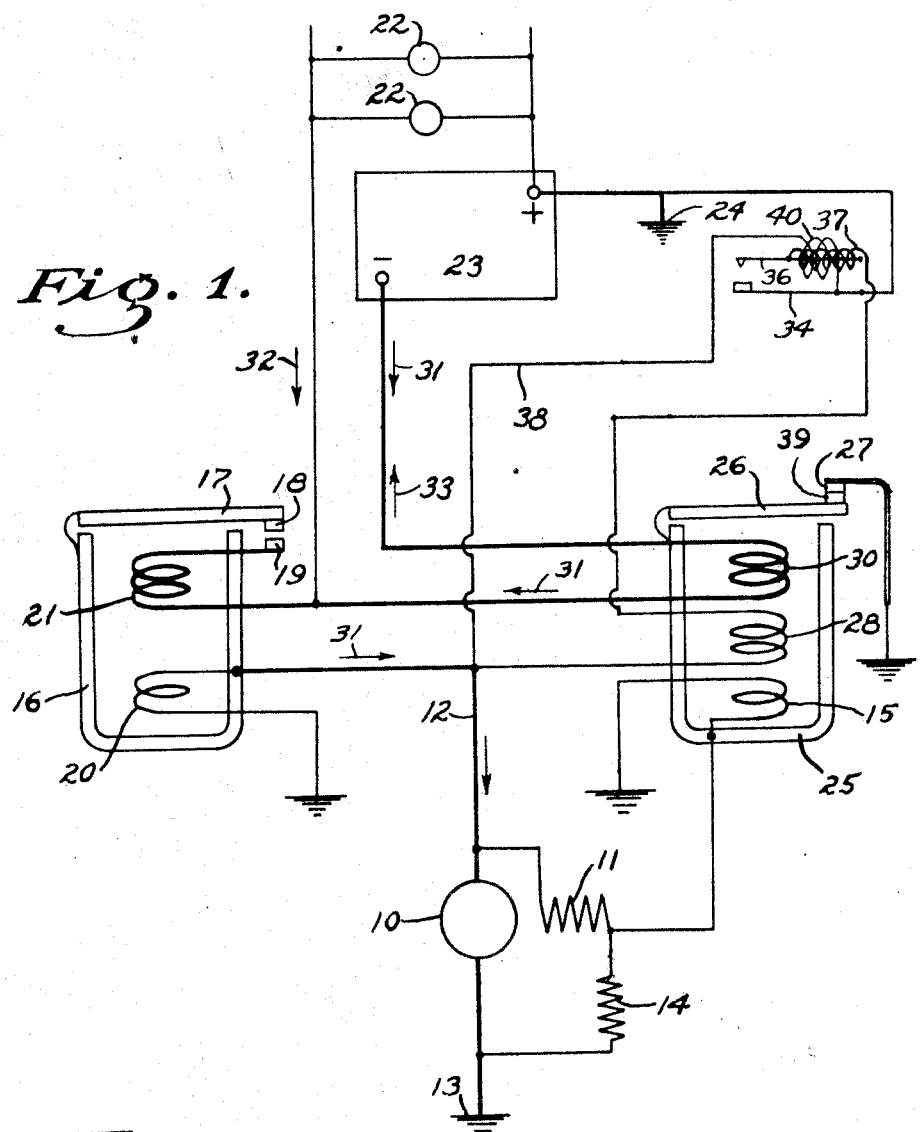
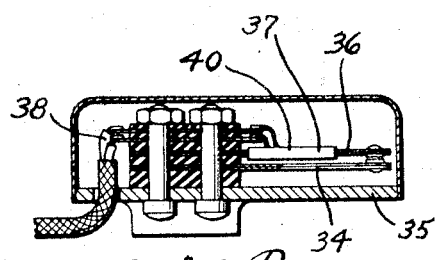

2,136,716

UNITED STATES PATENT OFFICE 2,136,716

REGULATOR FOR BATTERY CHARGING SYSTEMS

August Toelle, Detroit, Mich., assignor to Ford Motor Company, Dearborn, Mich., a corporation of Delaware Application October 29, 1934, Serial No. 750,530

11 Claims. (Cl. 171—314)

The object of my invention is to provide a regulator for controlling the output current of an automobile generator so that the battery associated with the automobile will be maintained in its fully charged condition but will not at any time be overcharged. Means are provided for increasing the maximum charging voltage as the temperature of the battery lowers so that a fully charged battery is provided under all weather conditions without danger of overcharge even in hot weather.

Still a further object of my invention is to provide a battery charging system wherein the battery "floats on the line" during the major portion of the operation of the vehicle, the generator supplying the load current irrespective of the charge in the battery. This is an important feature of my device and one wherein it differs from all other systems known to the applicant.

Still a further object of my invention is to provide a regulator which is adapted for use with a shunt-wound generator, the third brush type of regulation being unnecessary with the device shown.

Still a further object of my invention is to provide a novel means for varying the maximum charging voltage according to the ambient temperature of the battery.

With these and other objects in view, my invention consists in the arrangement, construction and combination of the various parts of my improved device, as described in the specification, claimed in my claims, and illustrated in the accompanying drawing, in which:

Figure 1 is a schematic wiring diagram, illustrating by solid lines the essential features of my improved regulating system, with the construction of an alternate temperature controller being shown by dotted lines, and Figure 2 is a side view of the preferred temperature controller which is shown in full lines in Figure 1.

Referring to the accompanying drawing, I have used the reference numeral 10 to indicate generally the armature of an automobile generator, which generator is provided with a shunt field winding 11. One end of the winding 11 is connected to an output lead 12 while the other end of this winding is grounded at 13 through a fixed resistance 14. The winding is not only permanently grounded through the resistance 14, but is also permanently grounded through a winding 15 which is associated with my regulator. The shunt winding 11 is still further adapted to be directly grounded through operable contact points in my regulator. Thus, a two rate output is obtained from the generator at any particular speed, this output being maximum when the winding 11 is directly grounded and being minimum when the resistance 14 and winding 15 are both in series with the winding 11 and the ground.

It will be noted from Figure 1 that I have provided a conventional cut-out in connection with my regulator, this cut-out forming a part of my invention only in so far as it cooperates with the regulator to produce a novel result. The cut-out comprises a core 16 to which is hinged a movable armature 17. One contact point 18 is fixed to this armature which point cooperates with a stationary point 19 when the armature is energized. As is usual, two windings are provided on this cut-out. The winding 20 is of high resistance having one end grounded and the other end electrically connected to the core 16. The lead 12 from the generator is also connected to the core 16 so as to place the winding 20 and armature 17 under the potential of the generator. A low resistance winding 21 of comparatively few turns is wound on the core 16, one end of this winding being connected to the stationary contact point 19 while the other end of the winding is connected directly to the negative side of the load circuit. The load circuit is illustrated diagrammatically by lamps 22 although all of the electrical equipment on the car is to be wired using similar circuits. A storage battery is given the reference numeral 23, the positive terminal of which is connected to the positive side of the load circuit. The positive terminal of the battery is also grounded at 24. It will be noted that the output end of the winding 21 is connected to the negative terminal of the battery in series with one coil of the regulator, the purpose of which will later be described.

The regulator portion of my device comprises a core 25 having an armature 26 hinged thereto, this armature having a contact point 39 thereon which is adapted to be grounded in its inoperative position to a contact point 27. Three windings are disposed around the regulator core. The first comprises the winding 15 which has previously been described, with the second consisting of a winding 28 which is wound in opposition thereto around the core. This winding 28 has one end fixed to the output lead 12 of the generator with the other end connected to one terminal of the temperature compensating means, shown in Figure 2. The third winding, numbered 30, has a comparatively low resistance, being composed of a relatively few turns of heavy wire. This winding 30 is wound in the same direction as the winding 28, having one end connected to the free end of the winding 21 while the other end is connected to the negative pole of the battery 23. Consequently, when the battery is either being charged or when the battery is discharging, current flows through the coil 30.

The purpose of the ambient temperature compensating means is to prevent an excessive charging current from entering the battery and still allow the battery to become fully charged in all temperatures. Battery manufacturers recommend substantially the following maximum charging voltages for three cell batteries at various temperatures:

| | Volts |
|---|---|
| At 0 degrees F | 8.3 |
| 20 degrees F | 8 |
| 40 degrees F | 7.75 |
| 60 degrees F | 7.5 |
| 80 degrees F | 7.2 |
| 100 degrees F | 6.9 |

The above table represents the maximum voltage that can be applied to the battery without causing the cells to gas. Of course, batteries may be charged at a higher voltage but gassing will occur and cause deterioration of the plates.

The compensator preferred comprises a bi-metal strip 34 having one end grounded to a bracket 35 which bracket is fastened to the frame of the car adjacent to the battery. A second bi-metal strip 36 is mounted above the strip 34 and is insulated therefrom, this second strip having a point thereon which is adapted to coact with the contact point on the strip 34 to complete a circuit therebetween. A heating coil 40 is mounted around the strip 36. The heating coil 40 is connected in series with the generator by means of a wire 38 and is so designed that a predetermined output voltage of the generator causes a definite deflection in the bi-metal strip 36, an increase in voltage causing the strip 36 to deflect downwardly. The lower strip 34 is also composed of bi-metal and responds solely to the ambient temperature of the battery, a reduction in temperature causing the strip to pull away from the strip 36. The two strips are so designed that a flow of current through the heater at 6.9 volts will cause sufficient deflection to complete the circuit with battery temperature at 100 degrees F. As the temperature lowers, the strip 34 pulls away thereby requiring a greater voltage in the heater coil to complete the circuit. This voltage is regulated according to the previously stated table of maximum voltages. When the circuit is completed through the temperature controller, the coil 28 is energized, which produces a flux which is added to that produced by the coil 30, thereby drawing the armature 26 downwardly to start its vibration.

The thermostat blade 36 is provided with a second heater coil 37 which is in series with the shunt coil 28 of the regulator magnet. The purpose of this second heater coil is to prevent the opening of the contact points on the thermostat blades due to a reduction in the generator voltage as the vibrating regulator comes into action. At idling speeds of the engine the generator voltage is less than the open circuit battery E. M. F. so that the thermostat blade contact points will again open and on an increase in generator speed and output the cycle of events will again be repeated as the condition of the battery approaches the fully charged state.

The operation of my regulator is substantially as follows: The armature 26 is grounded when inoperative while the cut-out points 18 and 19 are at such time open. When the generator is started, the shunt winding 11 is directly grounded through the points 27 so that the generator operates at its maximum charging rate. When an output voltage of about 6.5 volts is generated, the cut-out armature 17 is drawn downwardly and thus connects the generator to the battery through the coil 30. The winding 30 is now energized and tends to draw the armature 26 and open the points 27 and 39. It is not until the generator voltage reaches that corresponding to the maximum charging voltage at the ambient temperature of the battery that sufficient torque is impressed upon the armature 26, to open the points 27 and 39 and thus reduce the rate of the generator. When this occurs a reverse current flows through the coil 15 causing the armature 26 to return, thus causing the armature to vibrate. Such vibration, however, occurs only after the battery has been fully charged.

The normal direction of current flow when the battery is being charged is in the direction shown by arrows 31; that is, from the generator to the ground, then through the battery and then through coils 30 and 21 successively and back to the generator. If now the load at 22 is made greater than the reduced output of the generator, the battery being fully charged, the current generated will flow from the load circuit in the direction of arrow 31 to the coil 21. The battery will be required to assist in carrying the load so that the remainder of the load current will tend to flow through the coil 30 and battery 23 in the direction of arrow 33. This action necessitates a reversal of current in the coil 30 which opposes the magnetic flux produced by the winding 28 thereby allowing the armature 26 to directly ground the field winding 11 and immediately place the generator under its full charging rate, irrespective of the condition of the battery. In actual practice reversal of current through the winding 30 seldom occurs for the reason that, when the load becomes equal to the reduced output current of the generator, the current flow in the winding 30 drops off to zero which reduces the torque on the armature 26 so that the higher charging rate of the generator picks up the load, the battery simply floating on the line with the generator supplying its maximum output for the load.

The above action should be differentiated from the conventional regulating system wherein the generator charges the battery until it reaches a fully charged condition and then the generator output is reduced to a lower voltage until the battery charge is reduced a predetermined amount. In such case the generator will not return to its high charging rate until the battery voltage has lowered through the range required to operate the regulator. The effect of this is that the battery is either being charged or is being discharged all the time the generator is running. With this device, the battery is brought up to its fully charged condition and then when a load greater than the reduced output of the generator is required, the generator is immediately switched to its higher output rate so that the generator supplies current direct to the load rather than the battery supplying same. This condition causes a material increase in the life of the battery and is one of the most important functions of this mechanism. It is only when the load exceeds the maximum output of the generator that the battery is called upon to supply the extra current required to operate the load. This condition is seldom encountered as the maximum charging rate of a generator having voltage regulation may be considerably higher than when no regulation is provided.

The advantages of my improved device are that the battery is never charged at a voltage which will cause gassing of the electrolyte. Further, the battery is used only to supply the load when the generator is not operating, the battery floating on the line at other times with the generator supplying the full load current. Still further, the conventional third brush type of regulation may be dispensed with without impairing the operation of the device.

Some changes may be made in the arrangement, construction and combination of the various parts of my improved device without departing from the spirit of my invention, and it is my intention to cover by my claims such changes as may reasonably be included within the scope thereof.

I claim as my invention:

1. In combination, a storage battery, a generator adapted to charge said battery, a regulator adapted to reduce the charging rate of said generator when the battery attains a full charge, a thermostat comprising a pair of coacting contact points supported upon individual temperature responsive elements, the closing of said points completing a circuit through the regulator to thereby reduce the charging rate of the system, one of said temperature responsive elements having a heater associated therewith which is connected in the battery circuit so that an increase in battery voltage actuates said temperature responsive element through said heater to move the associated contact point towards the other of said points, and the other of said temperature responsive elements being actuated by the ambient temperature so that upon a reduction in said ambient temperaure said other contact point will be moved away from the first mentioned point and thereby require an increase in battery voltage to complete said circuit.

2. A device, as claimed in claim 1, wherein said temperature responsive elements comprise a pair of bi-metal strips.

3. A device, as claimed in claim 1, wherein said temperature responsive elements comprise a pair of bimetal strips and wherein said heater comprises a coil which is mounted around one of said strips.

4. In combination, a storage battery, a generator adapted to charge said battery, a regulator adapted to reduce the charging rate of said generator when the battery attains a full charge, a thermostat comprising a pair of coacting contact points one of which is supported upon a temperature responsive element, the closing of said points completing a circuit through the regulator to thereby reduce the charging rate of the system, a pair of heaters associated with said elements, one of said heaters being connected in the battery circuit in such manner that an increase in battery voltage actuates said element to move the associated contact point towards the other of said points, and the other of said heaters being connected in the battery circuit in series with said contact points so that upon the closing of said points the second mentioned heater is energized to thereby compensate for the reduction in the heat of the first mentioned heater caused by the reduction in battery voltage as the charging rate is reduced.

5. A device, as claimed in claim 4, wherein both of said contact points are supported upon temperature responsive elements, the element having said heaters associated therewith being disposed adjacent to the second element, and said second element being responsive to the ambient temperature so that a reduction in ambient temperature moves the associated contact point away from the point which is actuated by the heater controlled element.

6. A device, as claimed in claim 4, wherein said temperature responsive element comprises a strip of bimetal, and wherein said heaters comprise coils which are mounted around said strip.

7. In combination, a storage battery, a generator adapted to charge said battery, a regulator adapted to reduce the charging rate of said generator when the battery attains a full charge, a thermostat comprising a pair of coacting contact points, the closing of said points completing a circuit through the regulator to reduce the charging voltage of the system, voltage responsive means associated therewith whereby an increase in said charging voltage moves one of said points toward the other, and an auxiliary means effective only upon the closing of said points which assists said voltage responsive means in holding said points together, said auxiliary means compensating for the reduced effect of said voltage responsive means after the charging rate has been reduced.

8. A device, as claimed in claim 7, wherein the closing of said points is controlled also by the ambient temperature, a reduction in said temperature causing said points to close only at a higher voltage.

9. The combination of a storage battery, a generator supplying current of two different current rates to said battery, a regulator adapted to operably short circuit a resistance in the field circuit of the generator so as to cause said generator to operate upon the higher of its rates, and an ambient temperature controller disposed adjacent to said battery adapted to actuate said regulator, said controller comprising a pair of bi-metal members having co-operating contact points thereon for completing a circuit through said regulator, one of said members being responsive to the ambient temperature and the other of said members being responsive to the voltage of the battery.

10. The combination of a storage battery, a generator supplying current of two different current rates to said battery, a regulator adapted to operably short circuit a resistance in the field circuit of the generator so as to cause said generator to operate upon the higher of its rates, and an ambient temperature controller disposed adjacent to said battery adapted to actuate said regulator, said controller being responsive to both the ambient temperature and voltage of the battery and comprising a pair of bi-metal members having co-operating contact points thereon for completing a circuit through said regulator, one of said members being responsive to the ambient temperature and the other of said members having a heating coil therearound which is connected to the generator for the purpose described.

11. In combination, a generator, a storage battery, a regulator adapted to operably reduce the output current of the generator when the battery attains a fully charged condition, said regulator being actuated by a temperature and voltage responsive controller disposed adjacent to the battery, said controller comprising an electrically connected pair of cooperating switch elements in series with said regulator, one element of said switch being controlled by the ambient temperature with the other element controlled by the voltage of the battery, a pair of contacting points which when closed complete an electrical circuit through said regulator to operate same, one of said points being mounted upon a bi-metal support so as to move away from its co-operating point upon a reduction in temperature, and the other of said points being mounted upon a second bi-metal support, said second support having a heating coil disposed therearound which is energized by the charging circuit so that an increase in heat from said coil deflects said second support to move its contact point toward said first mentioned contact point.

AUGUST TOELLE.